United States Patent

[11] 3,625,991

| [72] | Inventors | Laszlo Beregi<br>Boulogne;<br>Pierre Hugon, Rueil-Malmaison; Jean-Claude Le Douarec, Suresnes, all of France |
|---|---|---|
| [21] | Appl. No. | 725,484 |
| [22] | Filed | Apr. 30, 1968 |
| [45] | Patented | Dec. 7, 1971 |
| [73] | Assignee | Societe en nom collectif Science Union Et Cie, Societe Francaise De Recherche Medicale<br>Suresnes, France |
| [32] | Priority | May 12, 1967 |
| [33] | | Great Britain |
| [31] | | 22,249/67 |

[54] BENZOYLOXYETHYL-AMINO PROPANE COMPOUNDS
7 Claims, No Drawings

[52] U.S. Cl. .................................................. 260/477, 424/308
[51] Int. Cl. .................................................. C07c 95/08
[50] Field of Search ........................................... 260/477; 424/308

[56] References Cited
UNITED STATES PATENTS

| 2,971,018 | 2/1961 | Shapero et al. ............... | 260/477 |
| 2,421,129 | 5/1947 | Reasenberg et al. ........... | 260/477 |
| 1,193,651 | 8/1916 | Wildman et al. ............... | 260/477 |

FOREIGN PATENTS

| 632,561 | 11/1949 | Great Britain |
| 39/4617 | 10/1961 | Japan |

*Primary Examiner*—Charles B. Parker
*Assistant Examiner*—Jacqueline L. Davison
*Attorneys*—Gordon W. Hueschen and Hueschen and Kurlandsky

ABSTRACT: 1-phenyl-2-($\beta$-benzoyloxyethyl-amino) propane, mono- or disubstituted on the phenyl radical by chlorine, bromine, fluorine, lower-alkyl or lower-alkoxy having up to four carbon atoms inclusive, in the form of racemic compounds and optical isomers, and acid addition salts thereof.
These compounds possess anorexigenic and lipid metabolism regulating properties.

BENZOYLOXYETHYL-AMINO PROPANE COMPOUNDS

The present invention provides benzoyloxethyl-amino propane compounds of the general formula:

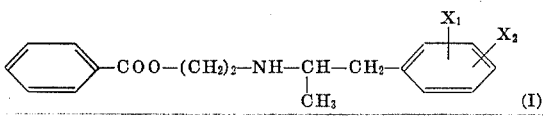

which $X_1$ and $X_2$ represent simultaneously or alternatively hydrogen, chlorine, bromine, fluorine, lower-alkyl or lower-alkoxy containing up to four carbon atoms inclusive, in the form of racemic compounds and optical isomers, including their salts and more especially their physiologically tolerable salts with mineral or organic acids.

The compounds of the general formula (I) are new and are prepared by esterifying, with benzoyl chloride, an amino-alcohol of the general formula II:

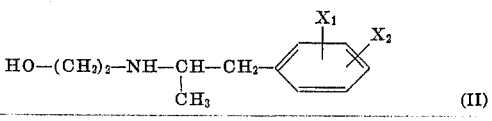

in which $X_1$ and $X_2$ have the meanings given above.

The amino-alcohols of the general formula II may be obtained by known processes starting from the appropriately substituted phenyl isopropylamine and ethylene oxide.

The esterfication may be carried out on racemic or dextro- or laevo- rotatory amino-alcohols. The resolution can be performed either on the subsituted phenyl isopropylamine in order to use the optical isomers as starting materials, or on the amino-alcohols of the general formula II. By the esterification process of this invention, the hydrochloride salts are formed which can be converted into the corresponding base by treatment with a concentrated solution of ammonium hydroxide.

The bases of the general formula I form acid addition salts with mineral acids such as, for example, as hydrochloric, hydrobromic, sulfuric, phosphoric and sulfamic acid, or with suitable organic acids such, for example, as acetic, propionic, maleic, fumaric, tartaric, citric, oxalic, benzoic and methanesulphonic acid.

The new compounds and their physiologically tolerable salts possess valuable pharmacological and therapeutic properties.

The acute toxicity of the new compounds, studied in mice, showed that the $LD_{50}$ is situated between 75 and 200 mg./kg. intraperitoneally, and between 600 and 1,400 mg./kg. per os.

The anorexigenic activity was demonstrated in the dog and rat according to the thesis of J. C. LE DOUAREC, University of Paris—1963—series V No. 382, and it was found that the active dose, suppressing entirely the food intake in the fasting animal, for 2 hours, varies from 3 to 40 mg./kg. p.o. It was also noted that these same doses had a lipomobilising activity in the rat, according to the method of DOLE V. P. published in J. Clin. Invest. 35,150 (1956), shown by an increase of the free fatty acids of the blood and a decrease of the reserve lipids—such as epididymal fat—up to 30 percent.

Therefore, the new compounds are useful and may be administered in animal or human therapy as anorectic drugs acting on the lipid metabolism for the alleviation of disorders thereof, and more especially in the treatment of obesity, particularly as an adjunct to or means of dietary control.

The doses of the active principle used may vary from 10 to 100 mg. and the active principle may be associated with the usual pharmaceutical carriers such, for example, as distilled water, talc, starch, ethyl cellulose, magnesium stearate, cocoabutter, etc., and presented in various pharmaceutical forms such, for example, as tablets, dragees, suppositories or drinkable or injectable solutions.

The present invention also includes pharmaceutical compositions, and their administration by oral, rectal or parenteral route, containing one or more compounds of the general formula I or their physiologically tolerable salts.

The following examples illustrate the invention but are not to be construed as limiting, all the parts being by weight and melting points being determined by the Kofler method.

EXAMPLE 1

1-(3',4'-dichlorophenyl)-2-(β-benzoyloxyethyl)-amino propane hydrochloride.

To 8.54 parts of 1-(3',4'-dichlorophenyl)-2(β-hydroxyethyl)-amino propane hydrochloride are added 12.64 parts of benzoyl chloride and the reaction mixture is maintained at 100°–110° C. with stirring. After about 30 minutes the reaction is complete. To the cooled mixture there are then added 100 parts of ether and the product is suctioned off. After recrystallization from isopropanol there are obtained 11 parts of 1-(3',4'-dichlorophenyl)-2-(β-benzoyloxyethyl)-amino propane hydrochloride, melting point 178°–179° C.

EXAMPLES 2–8

The following compounds were prepared according to the process described in example 1:

EXAMPLE 2

1-phenyl-2-(β-benzoyloxyethyl)-amino propane hydrochloride, M.P. 135°–136° C. (ethylacetate), starting from 1-phenyl-2-(β-hydroxyethyl)-amino propane.

EXAMPLE 3

1-(p-methoxyphenyl)-2-(β-benzoyloxyethyl)-amino propane hydrochloride, M.P. 137° C. (isopropanol), starting from 1-(p-methoxyphenyl)-2-(β-hydroxyethyl)-amino propane.

EXAMPLE 4

1-(p-chlorophenyl)-2-(β-benzoyloxyethyl)-amino propane hydrochloride, M.P. 153°–154° C. (isopropanol), starting from 1-(p-chlorophenyl)-2-(β-hydroxyethyl)-amino propane.

EXAMPLE 5

1-(3',4'-dimethylphenyl)-2-(β-benzoyloxyethyl)-amino propane hydrochloride, starting from 1-(3',4'-dimethylphenyl)-2-(β-hydroxyethyl)-amino propane, M.P. 135° C. (ethylacetate).

EXAMPLE 6 d 1-phenyl-2-(β-benzoyloxyethyl)-amino propane hydrochloride, M.P. 115°–116° C. (ethylacetate), $[\alpha]_D^{24}$= +24.4° (C.4; H$_2$O), starting from dl-phenyl-2-(β-hydroxyethyl)-amino propane

EXAMPLE 7

1-(p-bromophenyl)-2-(β-benzoyloxyethyl)-amino propane hydrochloride, starting from 1-(p-bromophenyl)-2-(β-hydroxyethyl)-amino propane.

EXAMPLE 8 1-(p-fluorophenyl)-2-(β-benzoyloxyethyl)-amino propane hydrochloride, starting from 1-(p-fluorophenyl)-2-(β-hydroxyethyl)-amino propane.

Where the foregoing examples produce a compound having a methyl group as a ring substituent, it is to be understood that compounds containing other lower-alkyl groups of straight or branched nature and containing up to four carbon atoms inclusive, such as ethyl, propyl, isopropyl, butyl, sec.-butyl, and t.-butyl are prepared in the same manner by substitution in the process of the appropriate different lower-alkyl starting material. Lower-alkoxy groups have the formula -OR, wherein R is lower-alkyl as above defined.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways or modes, for example, orally as in capsules or tablets, parenterally in the form of sterile solutions, suspensions, or by pellet implantation, and in some cases intravenously in the form of sterile solutions. Other modes of administration are cutaneously, bucally, intramuscularly, and intraperitoneally.

As representative of living animal bodies which may be treated with the compounds and compositions of the invention, and according to the method of treating of the invention, for alleviation of the same and/or similar conditions as those described, in addition to human beings may be mentioned the following: domestic animals such as dogs and cats, farm animals such as horses, cows, sheep pigs, and goats.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention may be used in cases of administration to subjects having a relatively low body weight, unit dosages are preferably 10 milligrams or above and preferably 20, 50, or 100 milligrams, or even higher, depending of course upon the subject treated and the particular result desired, as will be apparent to one skilled in the art. Broader ranges generally appear to be 10 to 100 milligrams per unit dose. The active agents of the invention may be combined for administration with other pharmacologically active agents, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established medical principles.

Various modifications and equivalents will be apparent to one skilled in the art and may be made in the compounds, compositions and methods of the present invention without departing from the spirit or scope thereof, and it is therefore to be understood that the invention is to be limited only by the scope of the appended claims.

What we claim is:

1. A compound selected from the group consisting of (A) benzoyloxyethyl amino propanes of the general formula I:

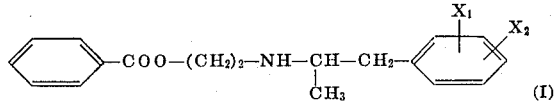

(I)

wherein $X_1$ and $X_2$ are selected from the group consisting of hydrogen, chlorine, bromine, fluorine, lower-alkyl and lower-alkoxy containing up to four carbon atoms inclusive, their racemates and optical isomers, and (B) physiologically acceptable addition salts thereof with organic and mineral acids.

2. A compound of claim 1 which is 1-(3', 4'-dichlorophenyl)-2-($\beta$-benzoyloxyethyl)-amino propane pharmaceutically acceptable acid addition salt.

3. A compound of claim 1 which is 1-phenyl-2-($\beta$-benzoyloxyethyl)-amino propane pharmaceutically acceptable acid addition salt.

4. A compound of claim 1 which is 1-(p-methoxyphenyl-2-($\beta$-benzoyloxyethyl)-amino propane pharmaceutically acceptable acid addition salt.

5. A compound of claim 1 which is 1-(p-chlorophenyl)-2-($\beta$-benzoyloxyethyl)-amino propane pharmaceutically acceptable acid addition salt.

6. A compound of claim 1 which is 1-(3', 4'-dimethylphenyl)2-($\beta$-benzoyloxyethyl)-amino propane pharmaceutically acceptable acid addition salt.

7. A compound of claim 1 which is $d$ 1-phenyl-2-($\beta$-benzoyloxyethyl)-amino propane pharmaceutically acceptable acid addition salt.

* * * * *